United States Patent [19]

Dumont et al.

[11] 3,960,536

[45] June 1, 1976

[54] ANTICHLOROSIS COMPOSITIONS FOR PLANTS

[75] Inventors: Louis Claude Dumont, Chaponost; René Antoine Paris, Lyon; Claude Mathilde Scharff, Villeurbanne, all of France

[73] Assignee: PEPRO, Societe pour le Developpement et la Vente de Specialites Chimiques, Lyon, France

[22] Filed: Sept. 12, 1974

[21] Appl. No.: 505,510

[30] Foreign Application Priority Data

Sept. 25, 1973 France .............................. 73.35083

[52] U.S. Cl. ................................... 71/1; 71/DIG. 2
[51] Int. Cl.² ......................................... C05C 13/00
[58] Field of Search ........................... 71/1, DIG. 2; 252/DIG. 11; 260/439 R

[56] References Cited
UNITED STATES PATENTS

| | | |
|---|---|---|
| 2,534,787 | 12/1950 | Mecca .............................. 71/DIG. 2 |
| 2,833,640 | 5/1958 | Bersworth ........................ 71/DIG. 2 |
| 3,131,048 | 4/1964 | Balassa ............................ 71/DIG. 2 |
| 3,159,477 | 12/1964 | Wilson ............................. 71/DIG. 2 |
| 3,227,543 | 1/1966 | O'Donnell ....................... 71/DIG. 2 |

*Primary Examiner*—Thomas G. Wyse
*Assistant Examiner*—Robert H. Spitzer
*Attorney, Agent, or Firm*—McDougall, Hersh & Scott

[57] ABSTRACT

Plant-protection compositions. They contain as active material at least one mixed chelate with two coordinates, such as ethylene diamine, triethanolamine, tartaric acid, picolic acid, dipicolic acid, dihydro-2,4-benzoic acid, salicylic acid, p-aminosalicylic acid, 5-sulphosalicylic acid, 8-hydroxyquinoline, sodium pyrocatechol-3,5-disulphonate, ethylene diamine diacetic acid (or its alkali salts), ethylene diamine tetraacetic acid (or its alkali salts), nitrilotriacetic acid, sodium dihydroxynaphthalene disulphonate. These compositions protect plants against hypoferric chlorosis.

5 Claims, No Drawings

ANTICHLOROSIS COMPOSITIONS FOR PLANTS

This invention relates to compositions suitable for use in protecting plants against chlorosis.

Chlorosis is a plant disease caused by the blockage of iron by precipitation in hydroxide form by limestone, iron being an oligoelement essential to the formation of chlorophyll. The plants thus deprived of assimilable iron (hence the name hypoferric chlorosis), rapidly wither away by yellowing.

Attempts have long been made to correct this deficiency by feeding the plants with iron in assimilable form, originally in the form of ferric salts. Ferric salts act to a certain extent by foliar penetration, but are substantially ineffectual when used for soil treatment. It is through the roots that the penetration of iron is at its most effective in controlling chlorosis. In this connection, simple iron salts have been replaced by iron chelates which are hydrosoluble complexes consisting of an iron atom attached to several points of a single organic molecule known as chelatants or co-ordinates. Some of these products known as hexadentates, such as complexes of iron with ethylene diamine tetracetic acid (EDTA) or with diethylene triamine pentacetic acid or with N,N'-ethylene-bis-orthohydroxyphenyl-α-aminoacetic acids, have been successfully used against chlorosis, and the last of these compounds above all can be used in alkaline soils which promote hydrolysis of most of the ferric or ferrous solutions. However, it should be pointed out that if complicated structures are selected with a view to improving the stability of the chelates and, hence, their resistance to hydrolysis in a wide pH-range, the difficulties involved in synthesising chelating agents are generally increased, in addition to which it is necessary to use less common and more expensive starting products.

This is a restraint to the use of these compounds, although the need for them is being felt to an ever increasing extent both with a view to cultivation in limey soil and with a view to improving crops.

The object of the invention is to remedy this situation by providing economic and effective compositions for controlling hypoferric chlorosis in chalky soils. These compositions are characterised by an effective content of mixed di-, tri- or tetra-dentate chelates of iron with two co-ordinates per iron atom in their molecule.

Certain mixed chelates are known to show excellent resistance to hydrolysis in alkaline medium (Bulletin de la Societe Chimique de France 1966, page 752). However, it has now been found that this property is not sufficient in itself and that only a few of these mixed chelate complexes can be used for effectively controlling hypoferric chlorosis in plants. Reference is made in this connection to mixed chelates of iron with the following hydrosoluble co-ordinates:

ethylene diamine (EN)
triethanolamine (TEA)
tartaric acid
picolic acid
dipicolic acid
dihydro-2,4-benzoic acid (DHB)
salicylic acid
p-aminosalicylic acid (PAS)
sulpho-5-salicylic acid (SSA)
8-hydroxyquinoline
sodium pyrocatechol-3,5-disulphonate
ethylene diamine diacetic acid (EDDA) or its alkali salts
ethylene diamine tetracetic acid (ETA) or its alkali salts
nitrilotriacetic acid (NTA)
sodium dihydroxy naphthalene disulphonate (DHSN).

Chelates with two different co-ordinates can be used with excellent results. For a given pair of co-ordinates, experience has shown that a better effect is obtained when the quantity of co-ordinates in the molecule greatly exceeds stoichiometry.

The complexes present in the following compositions are mentioned as examples of products of this kind active in controlling hypoferric chlorosis in plants:

| Co-ordinates | Molar ratios |
| --- | --- |
| DHB:EN:Fe | 10:10:1 |
| DHB:dipicolic acid:Fe | 5:2.5:1 |
| DHB:NTA:Fe | 2:2:1 |
| DHB:NTA:Fe | 10:10:1 |
| SSA:EN:Fe | 10:10:1 |
| SSA:dipicolic acid:Fe | 10:5:1 |
| Sodium pyrocatechol-3,5-disulphonate:EDDA:Fe | 1:2.4:1 |
| Sodium pyrocatechol-3,5-disulphonate:EDTA:Fe | 1:1:1 |
| Sodium pyrocatechol-3,5-disulphonate:PAS:Fe | 2:4:1 |
| Sodium pyrocatechol-3,5-disulphonate:dipicolic acid:Fe | 2:2:1 |
| Sodium pyrocatechol-3,5-disulphonate:EN:Fe | 2:2:1 |
| Sodium pyrocatechol-3,5-disulphonate:NTA:Fe | 1:2:1 |
| Sodium pyrocatechol-3,5-disulphonate:tartaric acid:Fe | 1:1:1 |
| NTA:dipicolic acid:Fe | 2:2:1 |
| DHSN:NTA:Fe | 2:2:1 |
| DHSN:dipicolic acid:Fe | 2:4:1 |
| Sodium pyrocatechol-3,5-disulphonate:citric acid:Fe | 1:1:1 |
| SSA:citric acid:Fe | 4:2:1 |

These products are obtained by dissolving in water each of the starting co-ordinates and the iron salt either simultaneously or in succession. In this case, it is possible in particular to prepare a mixture of one of the co-ordinates with the iron salt to form a simple chelate, the mixed chelates being obtained by dissolving the second co-ordinate in the solution of the simple chelate. This reaction readily takes place by virtue of the greater stability of the mixed compound in relation to the simple compound.

The preparation and activity of the compounds according to the invention is illustrated by, but by no means limited to, the following Examples.

EXAMPLE 1

Preparation of a solution of the complex SSA:EN:Fe (ratio 10:10:1)

455.2 g of SSA are dissolved in 500 ml of water. 140 g of ethylene diamine are added, followed by the introduction of 102.8 g of $FeCl_3$ (27.5 to 29 % solution). The solution is made up to 1 liter. 1 liter of solution of pH 6.8 containing 10 g of iron is obtained.

EXAMPLE 2

Preparation of a solution of the complex DHB:EN:Fe (ratio 10:10:1)

70 g of ethylene diamine are dissolved in 700 ml of water. 51.40 g of $FeCl_3$ (27.5 to 29 % solution) are dissolved in the resulting solution. After complete dissolution, 138 g of DHB are added. The solution is made up to 1 liter. 1 liter of solution of pH 8 containing 5 g of iron is obtained.

EXAMPLE 3

Haricot seeds ("Roi des Belges" variety) are planted in one group of 7 cm diameter pots containing a soil from Frontignan (France), characterised by an iron content of 29 ppm, a total chalk content of 825% and an active chalk content of 235%, whilst rooted cuttings of chrysanthemums of the "Deep Tunful" variety are planted in another group of identical pots filled with the same soil. The same procedure is adopted with control pots containing clean soil. The pots are then placed under glass according to a daily cycle of 16 hours' lighting (approximately 12000 lux at plant level) at a temperature of 24°C, and 8 hours' darkness at a temperature of 14°C.

After 11 days, the seed leaves are removed from the haricot beans, and the chrysanthemum suckers cut off.

On the twelfth day, each pot is sprayed with 10 ml of an aqueous solution of mixed chelates adjusted to an iron concentration of 1 %, one pot being treated with an equivalent solution of ferric chloride, another with a solution of Sequestrene 138 based on the sodium salt of ethylene diamine di-(hydroxyphenyl)-acetic acid (EDDHA).

On the 14th day, the first primordial leaf of the haricot beans is removed, and all the pots sprayed as on the 12th day. On about the 16th day, the second primordial leaf of the haricot beans is removed.

Between the 35th and 45th days, the plants are visually assessed for the colour of their leaves.

Finally, all the leaves are removed on or around the fiftieth day. The chlorophyll is extracted by treating the leaves with methanol and determined by spectrophotometry. Under these conditions, the following results are obtained, being expressed in optical density per gram of fresh material relative to the untreated control in accordance with Abbot's formula:

$$\text{Effectiveness} = \frac{OD/g \text{ of product} - OD/g \text{ of control}}{OD/g \text{ of control}} \times 100$$

The figures quoted are the averages of approximately 20 repetitions.

| Compounds tested | Anti-chlorosis effectiveness |
|---|---|
| DHB:EN:Fe 10:10:1 | 29.1 |
| DHSN:NTA:Fe 2:2:1 | 26.7 |
| DHB:dipicolic acid:Fe 5:2.5:1 | 24.5 |
| SSA:EN:Fe 10:10:1 | 22.1 |
| Sodium pyrocatechol-3,5-disulphonate: EDTA:Fe 1:1:1 | 19.5 |
| Sodium pyrocatechol-3,5-disulphonate: tartaric acid:Fe 1:1:1 | 18.7 |
| Sodium pyrocatechol-3,5-disulphonate: PAS:Fe 4:2:1 | 18.4 |
| DHSN:dipicolic acid:Fe 2:4:1 | 16.3 |
| Sodium pyrocatechol-3,5-disulphonate: dipicolic acid:Fe 2:2:1 | 13.1 |
| FeCl$_3$ | 6.2 |

This Table clearly shows that the compounds according to the invention are greatly superior to ferric chloride in their antichlorosis activity. It should also be noted that the first two chelates are similar in their effect to Sequestrene 138 which is considered to be one of the best commercial products for this application. Finally, it should be underlined that none of the products tested proved to be phytotoxic.

In addition, some of the products according to the invention, tested in the open by spraying onto fruit trees, especially peach trees, and onto plum trees, have given good results.

Accordingly, these Examples show on the one hand the ready preparation and on the other hand the remarkable properties of compositions containing the compounds according to the invention which are therefore suitable for use in controlling chlorosis among vegetable crops, especially in viticulture, fruit and ornamental arboriculture and horticulture.

These compositions have other significant advantages such as their stability in storage and their non-corrosive character.

By virtue of their high solubility in water, the chelates according to the invention are applied in the form of aqueous solutions by leaf spraying and above all in soil treatment which is the more effective form of treatment. The doses in which the chelates according to the invention are used may vary within wide limits in dependence upon the activity of the product, upon the seriousness of iron deficiency in the soil and upon the size of the vegetables to be treated. Generally, this dose, expressed as the iron content of the solution, is between 0.1 and 5 kg/ha.

In addition, the treatment can be carried out both as a curative and as a preventive measure. The compounds according to the invention can of course be mixed with liquid fertilisers or other essentially fungicidal and insecticidal pesticides, known antichlorosis compounds or growth regulators.

We claim:

1. Compositions suitable for use in controlling hypoferric chlorosis in plants, characterized in that they contain an effective quantity of at least one mixed chelate with at least two co-ordinates selected from the group consisting of

| Co-ordinates | Molar ratios |
|---|---|
| [DHB] dihydro-2,4-benzoic acid: [EN] ethylene diamine: Fe | 10:10:1 |
| [DHB] dihydro-2,4-benzoic acid: dipicolic acid: Fe | 5:2.5:1 |
| [DHB] dihydro-2,4-benzoic acid: [NTA] nitrilo triacetic acid: Fe | 2:2:1 |
| [DHB] dihydro-2,4-benzoic acid: [NTA] nitrilo triacetic acid: Fe | 10:10:1 |
| [SSA] sulpho-5-salicylic acid: [EN] ethylene diamine: Fe | 10:10:1 |
| [SSA] sulpho-5-salicylic acid: dipicolic acid: Fe | 10:5:1 |
| Sodium pyrocatechol-3,5-disulphonate: [EDDA] ethylene diamine diacetic acid: Fe | 1:2.4-1 |
| Sodium pyrocatechol-3,5-disulphonate: [EDTA] ethylene diamine triacetic acid: Fe | 1:1:1 |
| Sodium pyrocatechol-3,5-disulphonate: [PAS] p-amino-salicylic acid: Fe | 2:4:1 |
| Sodium pyrocatechol-3,5-disulphonate: dipicolic acid: Fe | 2:2:1 |
| Sodium pyrocatechol-3,5-disulphonate: [EN] ethylene diamine: Fe | 2:2:1 |
| Sodium pyrocatechol-3,5-disulphonate: [NTA] nitrilo triacetic acid: Fe | 1:2:1 |
| Sodium pyrocatechol-3,5-disulphonate: tartaric acid: Fe | 1:1:1 |
| [NTA] nitrilo triacetic acid: dipicolic acid: Fe | 2:2:1 |
| [DHSN] Sodium dihydroxy naphthalene disulphonate: [NTA] nitrilo triacetic acid: Fe | 2:2:1 |

-continued

| Co-ordinates | Molar ratios |
|---|---|
| [DHSN] Sodium dihydroxy naphthalene disulphonate: dipicolic acid: Fe | 2:4:1 |
| Sodium pyrocatechol-3,5-disulphonate: citric acid: Fe | 1:1:1 |
| [SSA] Sulpho-5-salicylic acid: citric acid: Fe | 4:2:1 | in which Fe represents iron in ionized form.

2. A method of preventing or curing hypoferric chlorosis in plants, comprising treating the plants by soil preparation or by spraying with a composition as claimed in claim 1.

3. A method as claimed in claim 2 in which the composition is applied from an aqueous solution.

4. A method as claimed in claim 2 in which the plants are treated by spraying the leaves with an aqueous solution of the composition in an amount within the range of 0.1 to 5 kg/ha calculated on the basis of the iron content of the solution.

5. A method as claimed in claim 2 in which treatment is effected by incorporating the solution in the soil in an amount within the range of 0.01 to 5 kg/ha calculated on the basis of the iron content of the solution.

* * * * *